(12) United States Patent
Kelkar et al.

(10) Patent No.: US 11,800,879 B2
(45) Date of Patent: Oct. 31, 2023

(54) PLANT-BASED FROZEN CONFECTION

(71) Applicant: WELLS ENTERPRISES, INC., Le Mars, IA (US)

(72) Inventors: Vishwesh S. Kelkar, Sioux City, IA (US); Alan C. Cunningham, Davidson, NC (US); Heather D. Peters, Hinton, IA (US)

(73) Assignee: WELLS ENTERPRISES, INC., Le Mars, IA (US)

( * ) Notice: Subject to any disclaimer, the term of this patent is extended or adjusted under 35 U.S.C. 154(b) by 768 days.

(21) Appl. No.: 16/710,518

(22) Filed: Dec. 11, 2019

(65) Prior Publication Data

US 2020/0178556 A1 Jun. 11, 2020

Related U.S. Application Data

(60) Provisional application No. 62/777,967, filed on Dec. 11, 2018.

(51) Int. Cl.
| | | |
|---|---|---|
| *A23G 9/42* | (2006.01) | |
| *A23G 9/38* | (2006.01) | |
| *A23G 3/48* | (2006.01) | |
| *A23G 3/42* | (2006.01) | |
| *A23G 3/44* | (2006.01) | |

(52) U.S. Cl.
CPC .............. *A23G 3/48* (2013.01); *A23G 3/42* (2013.01); *A23G 3/44* (2013.01); *A23G 9/38* (2013.01); *A23G 9/42* (2013.01)

(58) Field of Classification Search
None
See application file for complete search history.

(56) References Cited

U.S. PATENT DOCUMENTS

2008/0248185 A1* 10/2008 Ferrari .................... A23L 29/10
426/616

FOREIGN PATENT DOCUMENTS

| WO | WO-8602809 A | * | 5/1986 | ............... A23G 9/52 |
| WO | WO-2014162616 A1 | * | 10/2014 | ............... A23G 9/32 |
| WO | WO-2017001265 A1 | * | 1/2017 | ............ A23G 9/327 |

* cited by examiner

*Primary Examiner* — Jyoti Chawla
(74) *Attorney, Agent, or Firm* — Barnes & Thornburg LLP

(57) ABSTRACT

The present disclosure provides frozen confectionary products comprising a base frozen confection, wherein the base frozen confection comprises i) a vegetable or vegetable derivative component and ii) one or more sweetening agents. The frozen confectionary products provided in the present disclosure may optionally comprise an oil, an emulsifier, a stabilizer, a salt, and water.

15 Claims, No Drawings

PLANT-BASED FROZEN CONFECTION

CROSS-REFERENCE TO RELATED APPLICATIONS

This application claims the benefit under 35 USC § 119(e) of U.S. Provisional Application Ser. No. 62/777,967, filed on Dec. 11, 2018, the entire disclosure of which is incorporated herein by reference.

BACKGROUND AND SUMMARY OF THE INVENTION

Frozen dessert confections, for example ice cream, are well enjoyed by consumers. However, certain consumers do not prefer typical ice cream products because of the presence of dairy ingredients such as milk, cream, and milk proteins. Furthermore, some consumers avoid dairy-based products due to allergies or intolerances while other consumers choose to avoid products of animal origin due to ethical reasons. Moreover, there is a growing consumer preference for plant-based foods.

Dietary guidelines released by the USDA in 2010 emphasize increased consumption of fruits, vegetables, and healthy sources of proteins such as beans and nuts in order to meet daily nutrition requirements for a healthy lifestyle. However, current data indicate that the average consumption of fruits and vegetables in the United Sates is lower than the daily quantities recommended for various age groups.

Despite the recent introduction of non-dairy frozen desserts in the market (for example, those which have replaced milk-based ingredients with nut-based milks, seeds, or fruits), there is a need for a frozen confection which closely imitates a typical ice cream and is free from the inherent flavors offered by the ingredients such as nut-based milks, seeds, and fruits that aim to replace dairy ingredients. Accordingly, the present disclosure provides frozen confectionary products which exhibit desirable properties and provide related advantages to satisfy consumer needs and also promote the fulfilment of the USDA's dietary guideline recommendations.

The present disclosure provides frozen confectionary products comprising a base frozen confection, wherein the base frozen confection comprises i) vegetable or vegetable derivative component and ii) one or more sweetening agents. The frozen confectionary products according to the present disclosure provide several advantages compared to other products known in the art.

For example, the frozen confectionary products can be made with vegetables and a sweetening agent, resulting in products that are free or substantially free of dairy ingredients such as milk and cream but able to provide indulgent sensorial characteristics of typical dairy-based products. Furthermore, the frozen confectionary products can comprise plant-based ingredients and could be developed to be vegan and/or gluten free. Consumption of the frozen confectionary products of the present disclosure can provide organoleptic and physical characteristics comparable to typical dairy-based products such as ice cream by delivering an experience reflected by a desirable smooth creamy texture, mouthfeel, and melt profile.

The following numbered embodiments are contemplated and are non-limiting:

1. A frozen confectionary product comprising a base frozen confection, wherein the base frozen confection comprises i) a vegetable or vegetable derivative component and ii) one or more sweetening agents.
2. The frozen confectionary product of clause 1, wherein the vegetable or vegetable derivative component is selected from the group consisting of a vegetable, a pulse, a vegetable protein, a nut solid, a seed solid, and any combination thereof.
3. The frozen confectionary product of clause 2, wherein the vegetable or vegetable derivative component is present between about 4% to about 70% (wt %) of the base frozen confection.
4. The frozen confectionary product of clause 2, wherein the vegetable or vegetable derivative component is present between about 10% to about 60% (wt %) of the base frozen confection.
5. The frozen confectionary product of clause 2, wherein the vegetable or vegetable derivative component is present between about 15% to about 50% (wt %) of the base frozen confection.
6. The frozen confectionary product of any one of clauses 1 to 5, wherein the vegetable is selected from the group consisting of cauliflower, sweet potato, avocado, butternut squash, pumpkin, spinach, zucchini, jicama, rutabaga, parsnips, turnips, spinach, kale, arugula, potato, carrots, peas, collard greens, lettuce, watercress, parsley, corn, plantains, taro, water chestnuts, acorn squash, tomatoes, hubbard squash, bell peppers, radishes, eggplant, cucumbers, cabbage, bamboo shoots, asparagus, artichokes, beets, cactus, celery, green beans, kohlrabi, mushrooms, chayote, and any combination thereof.
7. The frozen confectionary product of clause 6, wherein the vegetable is present between about 2% to about 25% (wt %) of the base frozen confection.
8. The frozen confectionary product of clause 6, wherein the vegetable is present between about 5% to about 20% (wt %) of the base frozen confection.
9. The frozen confectionary product of clause 6, wherein the vegetable is present between about 10% to about 15% (wt %) of the base frozen confection.
10. The frozen confectionary product of clause 2, wherein the pulse is a lentil.
11. The frozen confectionary product of clause 2, wherein the pulse is selected from the group consisting of navy beans, black beans, pinto beans, white cannellini beans, great northern beans, red kidney beans, black eye-peas, garbanzo beans, lentils, mung beans, pink beans, soy beans, split peas, white beans, faba beans, lupins, pigeon peas, Bambara beans, and any combination thereof.
12. The frozen confectionary product of clause 10 or clause 11, wherein the pulse is present between about 2% to about 25% (wt %) of the base frozen confection.
13. The frozen confectionary product of clause 10 or clause 11, wherein the pulse is present between about 5% to about 20% (wt %) of the base frozen confection.
14. The frozen confectionary product of clause 10 or clause 11, wherein the pulse is present between about 10% to about 15% (wt %) of the base frozen confection.
15. The frozen confectionary product of clause 2, wherein the vegetable protein is selected from the group consisting of pea protein, chickpeas, soy protein, wheat protein, cotton seed protein, sunflower seed, lupin protein, oat protein, lentil protein, sesame seed protein, broad bean protein, horse bean protein, alfalfa protein, clover protein, rice protein, tapioca protein, pumpkin protein, corn protein, and any combination thereof.

16. The frozen confectionary product of clause 15, wherein the vegetable protein is present between about 0.01% to about 10% (wt %) of the base frozen confection.
17. The frozen confectionary product of clause 15, wherein the vegetable protein is present between about 1% to about 6% (wt %) of the base frozen confection.
18. The frozen confectionary product of clause 15, wherein the vegetable protein is present between about 2% to about 4% (wt %) of the base frozen confection.
19. The frozen confectionary product of clause 2, wherein the nut solid is selected from the group consisting of almonds, cashews, peanuts, walnuts, macadamia nuts, pecans, pistachios, chestnuts, hazelnuts, Brazil nuts, pine nuts, pili nuts, and any combination thereof.
20. The frozen confectionary product of clause 19, wherein the nut solid is present between 0% to about 25% (wt %) of the base frozen confection.
21. The frozen confectionary product of clause 19, wherein the nut solid is present between 1% to about 18% (wt %) of the base frozen confection.
22. The frozen confectionary product of clause 19, wherein the nut solid is present between 2% to about 15% (wt %) of the base frozen confection.
23. The frozen confectionary product of clause 19, wherein the nut solid is present between 5% to about 10% (wt %) of the base frozen confection.
24. The frozen confectionary product of clause 2, wherein the seed solid is selected from the group consisting of sunflower, pepitas, pumpkin, millets, sesame, quinoa, flaxseed, chia, buckwheat, amaranth, and combinations thereof.
25. The frozen confectionary product of clause 24, wherein the seed solid is present between 0% to about 25% (wt %) of the base frozen confection.
26. The frozen confectionary product of clause 24, wherein the seed solid is present between 1% to about 18% (wt %) of the base frozen confection.
27. The frozen confectionary product of clause 24, wherein the seed solid is present between 2% to about 15% (wt %) of the base frozen confection.
28. The frozen confectionary product of clause 24, wherein the seed solid is present between 5% to about 10% (wt %) of the base frozen confection.
29. The frozen confectionary product of any one of clauses 1 to 28, wherein the one or more sweetening agents is selected from the group consisting of one or more traditional sweeteners, one or more non-traditional sweeteners, one or more sugar substitutes, one or more sugar alcohols, and any combination thereof.
30. The frozen confectionary product of clause 29, wherein the one or more traditional sweeteners is selected from the group consisting of tapioca syrup, corn syrup, high fructose corn syrup, brown rice syrup, molasses, invert sugar, golden syrup, maltose, sorghum syrup, cane sugar, beet sugar, turbinado sugar, light brown sugar, dark brown sugar, powdered sugar, fructose, muscovado sugar, and any combination thereof.
31. The frozen confectionary product of clause 29, wherein the one or more non-traditional sweeteners is selected from the group consisting of blue agave, dates, coconut palm sugar, maple syrup, honey, and any combination thereof.
32. The frozen confectionary product of clause 29, wherein the one or more sugar substitutes is selected from the group consisting of Rebaudioside-M (Reb M), Rebaudioside-A (Reb A), stevia leaf extract, allulose, aspartame, acesulfame k, and any combination thereof.
33. The frozen confectionary product of clause 29, wherein the one or more sugar alcohols is selected from the group consisting of erythritol, sorbitol, maltitol, xylitol, and any combination thereof.
34. The frozen confectionary product of any one of clauses 1 to 33, wherein the one or more sweetening agents is present between about 15% to about 35% (wt %) of the base frozen confection.
35. The frozen confectionary product of any one of clauses 1 to 34, wherein the base frozen confection further comprises an oil.
36. The frozen confectionary product of clause 35, wherein the oil is a saturated oil.
37. The frozen confectionary product of clause 36, wherein the saturated oil is selected from the group consisting of coconut oil, cocoa butter oil, shea oil, palm oil, palm kernel oil, and any combination thereof.
38. The frozen confectionary product of clause 36, wherein the oil is an unsaturated oil.
39. The frozen confectionary product of clause 38, wherein the unsaturated oil is selected from the group consisting of sunflower oil, safflower oil, avocado oil, olive oil, rice bran oil, walnut oil, sesame seed oil, cottonseed oil, soybean oil, canola oil, and any combination thereof.
40. The frozen confectionary product of any one of clauses 35 to 39, wherein the oil is present between about 6% to about 16% (wt %) of the base frozen confection.
41. The frozen confectionary product of any one of clauses 1 to 40, wherein the base frozen confection further comprises an emulsifier.
42. The frozen confectionary product of clause 41, wherein the emulsifier is sunflower lecithin, soy lecithin, and any combination thereof.
43. The frozen confectionary product of clause 41 or clause 42, wherein the emulsifier is present between about 0.001% to about 2% (wt %) of the base frozen confection.
44. The frozen confectionary product of any one of clauses 1 to 43, wherein the base frozen confection further comprises a stabilizer.
45. The frozen confectionary product of clause 44, wherein the stabilizer is a gum stabilizer.
46. The frozen confectionary product of clause 44 or clause 45, wherein the stabilizer is selected from the group consisting of carob bean gum, cellulose gum, xanthan gum, tara gum, gellen gum, agar, arrowroot, guar gum, tapioca starch, carrageenan, and any combination thereof.
47. The frozen confectionary product of any one of clauses 44 to 46, wherein the stabilizer is present between about 0.001% to about 2% (wt %) of the base frozen confection.
48. The frozen confectionary product of any one of clauses 1 to 47, wherein the base frozen confection further comprises a salt.
49. The frozen confectionary product of clause 48, wherein the salt is sea salt, kosher salt, reduced sodium salt, and any combination thereof.
50. The frozen confectionary product of clause 48 or clause 49, wherein the salt is present between about 0.001% to about 2% (wt %) of the base frozen confection.

51. The frozen confectionary product of any one of clauses 1 to 50, wherein the frozen confectionary product further comprises an adjunct composition.
52. The frozen confectionary product of clause 51, wherein the adjunct composition is caramel.
53. The frozen confectionary product of clause 51, wherein the adjunct composition is fudge.
54. The frozen confectionary product of clause 51, wherein the adjunct composition is chocolate.
55. The frozen confectionary product of clause 51, wherein the adjunct composition is strawberry flavoring.
56. The frozen confectionary product of clause 51, wherein the adjunct composition is one or more nut pieces.
57. The frozen confectionary product of clause 51, wherein the adjunct composition is cookie dough.
58. The frozen confectionary product of clause 51, wherein the adjunct composition is one or more baked pieces.
59. The frozen confectionary product of clause 51, wherein the adjunct composition is one or more candies.
60. The frozen confectionary product of any one of clauses 1 to 59, wherein the frozen confectionary product further comprises a bulking agent.
61. The frozen confectionary product of clause 60, wherein the bulking agent is selected from the group consisting of corn starch, modified corn starch, waxy maize starch, potato starch, potato flour, sweet potato flour, rice flour, chickpea flour, tapioca flour, oat flour, buckwheat flour, gram flour, millet flour, almond flour, almond meal, cashew flour, and any combination thereof.
62. The frozen confectionary product of any one of clauses 1 to 61, wherein the frozen confectionary product is substantially free of a dairy component.
63. The frozen confectionary product of clause 62, wherein the dairy component is a milk protein.
64. The frozen confectionary product of any one of clauses 1 to 61, wherein the frozen confectionary product is free of a dairy component.
65. The frozen confectionary product of clause 64, wherein the dairy component is a milk protein.
66. The frozen confectionary product of any one of clauses 1 to 65, wherein the frozen confectionary product has an overrun of about 30% to about 100% or an overrun of about 30% to about 60%.
67. A frozen confectionary product comprising a base frozen confection, wherein the base frozen confection comprises:
about 4% to about 70% of a vegetable or vegetable derivative component;
about 15% to about 35% of a sweetening agent;
about 6 to about 16% of an oil;
about 0.001 to about 2% of an emulsifier;
about 0.001 to about 2% of a stabilizer; and
about 0.001 to about 2% of a salt.
68. The frozen confectionary product of clause 67, wherein the vegetable or vegetable derivative component is selected from the group consisting of a vegetable, a pulse, a vegetable protein, a nut solid, and any combination thereof.
69. The frozen confectionary product of clause 68, wherein the vegetable is present between about 2% to about 25% (wt %) of the base frozen confection.
70. The frozen confectionary product of clause 68, wherein the pulse is present between about 2% to about 25% (wt %) of the base frozen confection.
71. The frozen confectionary product of clause 68, wherein the vegetable protein is present between about 0.01% to about 10% (wt %) of the base frozen confection.
72. The frozen confectionary product of clause 68, wherein the nut solid is present between 0% to about 25% (wt %) of the base frozen confection.
73. A frozen confectionary product comprising a base frozen confection, wherein the base frozen confection comprises:
about 4% to about 70% of a vegetable component;
wherein the vegetable or vegetable derivative component comprises about 5% to about 20% of a vegetable, about 5 to about 20% of a pulse, and about 1% to about 6% of a vegetable protein;
about 15% to about 35% of a sweetening agent;
about 6 to about 16% of an oil;
about 0.001 to about 2% of an emulsifier;
about 0.001 to about 2% of a stabilizer; and
about 0.001 to about 2% of a salt.

Various embodiments of the invention are described herein as follows. In one embodiment described herein, a frozen confectionary product is provided. The frozen confectionary product comprises a base frozen confection, wherein the base frozen confection comprises i) a vegetable or vegetable derivative component and ii) one or more sweetening agents.

As used herein, the term "frozen" has the general meaning in the art, and indicates that the product is solidified under freezing conditions to a hardpack, or to a pumpable consistency which not fluid or semi-fluid. The frozen confectionary products of the present disclosure may have one or more of the following characteristics: non-dairy, vegan, gluten free, and non-GMO.

As used herein, "base frozen confection" is refers to a composition excluding ingredients that may exist non-homogenously in the frozen confectionary product (for example, adjunct composition such as visibly identifiable viscous flavorings like fudge and caramel swirls, nut pieces, cookie dough pieces, baked pieces, candies, etc.). Generally, adjunct compositions may range from 5-15% by weight of the finished frozen confectionary product.

In various aspects, the vegetable or vegetable derivative component is selected from the group consisting of a vegetable, a pulse, a vegetable protein, a nut solid, a seed solid, and any combination thereof. In some embodiments, the vegetable or vegetable derivative component is present between about 4% to about 70% (wt %) of the base frozen confection. In other embodiments, the vegetable or vegetable derivative component is present between about 10% to about 60% (wt %) of the base frozen confection. In yet other embodiments, the vegetable or vegetable derivative component is present between about 15% to about 50% (wt %) of the base frozen confection.

As used herein, the term "vegetable" refers to plant material that is not a fruit, seed, or nut. As used herein, a "nut" or a "seed" shall not be considered to be a "vegetable" in the present disclosure.

In some embodiments, the vegetable is selected from the group consisting of cauliflower, sweet potato, avocado, butternut squash, pumpkin, spinach, zucchini, jicama, rutabaga, parsnips, turnips, spinach, kale, arugula, potato, carrots, peas, collard greens, lettuce, watercress, parsley, corn, plantains, taro, water chestnuts, acorn squash, tomatoes, hubbard squash, bell peppers, radishes, eggplant, cucumbers, cabbage, bamboo shoots, asparagus, artichokes, beets, cactus, celery, green beans, kohlrabi, mushrooms, chayote, and combinations thereof. Cauliflower and sweet potato are preferred vegetables for the present disclosure. Cauliflower provides a fairly neutral flavor palate and a yellowish-white color. Sweet potato has a fairly neutral flavor palate and may provide body/mouthfeel to the finished frozen confectionary product. In various embodiments, the vegetable is present between about 2% to about 25% (wt %) of the base frozen confection. In other embodiments, the vegetable is present between about 5% to about 20% (wt %) of the base frozen confection. In yet other embodiments, the vegetable is present between about 10% to about 15% (wt %) of the base frozen confection. The ingredients described herein are generally referred to in weight percentage (wt %) of the ingredient compared to the frozen confectionary product or the base frozen confection of which the ingredient is a part.

As used herein, a "pulse" refers to a fruit or a seed of a plant from the family Fabaceae (or Leguminosae). Such plants may be referred to a "legume." Although technically categorized as a pulse, for the purpose of the present disclosure, peanuts are considered to be a nut rather than a pulse. In some embodiments, the pulse is a lentil. A lentil is commonly known as an edible legume plant (i.e., *Lens culinaris* or *Lens esculenta*).

In various embodiments, the pulse is selected from the group consisting of navy beans, black beans, pinto beans, white cannellini beans, great northern beans, red kidney beans, black eye-peas, garbanzo beans, lentils, mung beans, pink beans, soy beans, split peas, white beans, faba beans, lupins, pigeon peas, Bambara beans, and combinations thereof. Navy bean is a preferred pulse as it provides a fairly neutral flavor palate and yellowish-white color. In certain embodiments, the pulse is present between about 2% to about 25% (wt %) of the base frozen confection. In other embodiments, the pulse is present between about 5% to about 20% (wt %) of the base frozen confection. In yet other embodiments, the pulse is present between about 10% to about 15% (wt %) of the base frozen confection.

As used herein, a "vegetable protein" refers to a protein derived from plant sources. As used herein, the term "vegetable protein" does not include proteins derived from nuts.

In certain embodiments, the vegetable protein is selected from the group consisting of pea protein, chickpeas, soy protein, wheat protein, cotton seed protein, sunflower seed, lupin protein, oat protein, lentil protein, sesame seed protein, broad bean protein, horse bean protein, alfalfa protein, clover protein, rice protein, tapioca protein, pumpkin protein, corn protein, and combinations thereof. Pea protein is a preferred vegetable protein due to its functionality, availability, gluten free characteristics, and economic value. In some embodiments, the vegetable protein is present between about 0.01% to about 10% (wt %) of the base frozen confection. In other embodiments, the vegetable protein is present between about 1% to about 6% (wt %) of the base frozen confection. In yet other embodiments, the vegetable protein is present between about 2% to about 4% (wt %) of the base frozen confection.

As used herein, a "nut solid" refers to a solid material that is derived from a nut source, for example those which come from within a hard shell. As used herein, a "nut" shall not be considered to be a "vegetable" in the present disclosure. Although technically categorized as a pulse, for the purpose of the present disclosure, peanuts are considered to be a nut rather than a pulse.

In various embodiments, the nut solid is selected from the group consisting of almonds, cashews, peanuts, walnuts, macadamia nuts, pecans, pistachios, chestnuts, hazelnuts, Brazil nuts, pine nuts, pili nuts, and combinations thereof. In certain embodiments, the nut solid is present between 0% to about 25% (wt %) of the base frozen confection. In other embodiments, the nut solid is present between 1% to about 18% (wt %) of the base frozen confection. In yet other embodiments, the nut solid is present between 2% to about 15% (wt %) of the base frozen confection. In other embodiments, the nut solid is present between 5% to about 10% (wt %) of the base frozen confection.

As used herein, a "seed solid" refers to a solid material that is derived from a seed source, for example those which come from within a hard shell. As used herein, a "seed" shall not be considered to be a "vegetable" in the present disclosure.

In various embodiments, the seed solid is selected from the group consisting of sunflower, pepitas, pumpkin, millets, sesame, quinoa, flaxseed, chia, buckwheat, amaranth, and combinations thereof. In certain embodiments, the seed solid is present between 0% to about 25% (wt %) of the base frozen confection. In other embodiments, the seed solid is present between 1% to about 18% (wt %) of the base frozen confection. In yet other embodiments, the seed solid is present between 2% to about 15% (wt %) of the base frozen confection. In other embodiments, the seed solid is present between 5% to about 10% (wt %) of the base frozen confection.

In various embodiments, the one or more sweetening agents is selected from the group consisting of one or more traditional sweeteners, one or more non-traditional sweeteners, one or more sugar substitutes, one or more sugar alcohols, and any combination thereof. In various embodiments, the one or more sweetening agents is present between about 15% to about 35% (wt %) of the base frozen confection.

In certain embodiments, the one or more traditional sweeteners is selected from the group consisting of tapioca syrup, corn syrup, high fructose corn syrup, brown rice syrup, molasses, invert sugar, golden syrup, maltose, sorghum syrup, cane sugar, beet sugar, turbinado sugar, light brown sugar, dark brown sugar, powdered sugar, fructose, muscovado sugar, and any combination thereof.

In illustrative embodiments, the non-traditional sweetener is selected from the group consisting of blue agave, dates, coconut palm sugar, maple syrup, honey, and combinations thereof. As used herein, a "non-traditional sweetener" refers to an ingredient having a source of sweetness that may be derived from animals, from plants or plant parts, from seeds, from nectar or flowers, from roots, from sap, and the like. Blue agave is a preferred non-traditional sweetener due to its neutral flavor and lighter yellow color compared to other non-traditional sweeteners listed herein.

In certain embodiments, the one or more sugar substitutes is selected from the group consisting of Rebaudioside-M (Reb M), Rebaudioside-A (Reb A), stevia leaf extract, allulose, aspartame, acesulfame k, and any combination thereof.

In illustrative embodiments, the one or more sugar alcohols is selected from the group consisting of erythritol, sorbitol, maltitol, xylitol, and any combination thereof.

In some embodiments, the base frozen confection further comprises an oil. In certain embodiments, the oil is a saturated oil. In other embodiments, the oil is unsaturated oil. In yet other embodiments, the oil is a combination of a saturated oil and an unsaturated oil. As used herein, a "saturated oil" refers to oils and fats that have at least 30 wt % of their fatty acid moieties as saturated fatty acids. As used herein, an "unsaturated oil" refers to edible triglyceride-based oils including both monounsaturated and polyunsaturated oils.

In some embodiments, the saturated oil is selected from the group consisting of coconut oil, cocoa butter oil, shea oil, palm oil, palm kernel oil, and combinations thereof. Coconut oil is a preferred saturated oil as it may be refined, bleached, and deodorized, resulting in a neutral flavor. In some embodiments, the unsaturated oil is selected from the group consisting of sunflower oil, safflower oil, avocado oil, olive oil, rice bran oil, walnut oil, sesame seed oil, cottonseed oil, soybean oil, canola oil, and any combination thereof. In various embodiments, the oil is present between about 6% to about 16% (wt %) of the base frozen confection.

In some embodiments, the base frozen confection further comprises an emulsifier. Emulsifiers may aid in whipping the initial mixture with air, improve texture, and improve stability. Typical dairy-based frozen confections generally use mono- and di-glycerides or eggs as emulsifiers. However, for the present disclosure, these emulsifiers are not contemplated.

In various embodiments, the emulsifier is sunflower lecithin, soy lecithin, and combinations thereof. Sunflower lecithin is a preferred emulsifier as it is believed to be a cleaner emulsifier. In certain embodiments, the emulsifier is present between about 0.001% to about 2% (wt %) of the base frozen confection.

In some embodiments, the base frozen confection further comprises a stabilizer. Without intending to be bound by theory, stabilizers may improve the texture and consistency of the product and/or prevent the product from crystallizing. Gum stabilizers are known to be particularly effective in controlling viscosity, providing mouth feel, and improving whipping (aerating) properties of a frozen confectionary product. Furthermore, gum stabilizers can provide a protective colloid to stabilize proteins to heat processing, modify the surface chemistry of fat surfaces to minimize creaming, and increase the freeze-thaw stability of a frozen confectionary product. In certain aspects, the stabilizer is a gum stabilizer.

In certain embodiments, the stabilizer is selected from the group consisting of carob bean gum, cellulose gum, xanthan gum, tara gum, gellen gum, agar, arrowroot, guar gum, tapioca starch, carrageenan, and combinations thereof. In various embodiments, the stabilizer is present between about 0.001% to about 2% (wt %) of the base frozen confection.

In some embodiments, the base frozen confection further comprises a salt. In certain aspects, the salt is sea salt, kosher salt, reduced sodium salt, and any combination thereof. In various embodiments, the salt is present between about 0.001% to about 2% (wt %) of the base frozen confection.

In some embodiments, the base frozen confection further comprises water. In various aspects, water is present between about 30% to about 50% (wt %) of the base frozen confection.

In some aspects, the frozen confectionary product further comprises an adjunct composition. An "adjunct composition" refers to ingredients that may exist non-homogenously in the frozen confectionary product (for example, visibly identifiable viscous flavorings like fudge and caramel swirls, nut pieces, cookie dough pieces, baked pieces, candies, etc.). Generally, adjunct compositions may range from 5-15% by weight of the finished frozen confectionary product. The finished frozen confectionary product can include one or more adjunct compositions according to the desired flavor.

In some embodiments, the adjunct composition is caramel. In other embodiments, the adjunct composition is fudge. In yet other embodiments, the adjunct composition is chocolate. In some embodiments, the adjunct composition is strawberry flavoring. In other embodiments, the adjunct composition is one or more nut pieces. In yet other embodiments, the adjunct composition is cookie dough. In some embodiments, the adjunct composition is one or more baked pieces. In other embodiments, the adjunct composition is one or more candies.

It is further contemplated that the frozen confectionary products described herein may be flavored with various flavors typically associated with ice cream and related products. Exemplary flavors include but are not limited to chocolate, vanilla, strawberry, cookies & cream, mint chocolate chip, rocky road, coffee, pistachio, cherry, praline pecan, and others, or a combination of the foregoing.

In some aspects, the frozen confectionary product further comprises a bulking agent. As used herein, a "bulking agent" refers to a component included in the product to provide qualities such as additional mass, reduced calories, and/or water solubility. In illustrative embodiments, the bulking agent is selected from the group consisting of corn starch, modified corn starch, waxy maize starch, potato starch, potato flour, sweet potato flour, rice flour, chickpea flour, tapioca flour, oat flour, buckwheat flour, gram flour, millet flour, almond flour, almond meal, cashew flour, and any combination thereof.

In certain aspects, the frozen confectionary product is substantially free of a dairy component. As used herein, "substantially free" means less than about 5 wt % of a component. The frozen confectionary products described herein can be substantially free of dairy components such as milk proteins. Milk proteins are generally known in the art to be obtained from a dairy source, including but not limited to whole milk, skim milk, condensed milk, evaporated milk, cream, butter, butterfat, whey, milk solids non-fat, and the like.

In certain aspects, the frozen confectionary product is free of a dairy component. As used herein, "free" means less than about 1 wt % of a component. In some embodiments, the frozen confectionary product is completely free of a diary component (e.g., 0%).

In various embodiments, the frozen confectionary product may be aerated. In various embodiments, the frozen confectionary product has an overrun of about 30% to about 100%, an overrun of about 30% to about 90%, an overrun of about 30% to about 80%, an overrun of about 30% to about 70%, or an overrun of about 30% to about 60%. "Overrun" is defined by the equation below and is measured at atmospheric pressure:

$$\text{Overrun \%} = ((\text{density of mix} - \text{density of frozen confection}) / \text{density of frozen confection}) \times 100$$

It is contemplated that the frozen confectionary products may be made using methods for making frozen products that are well understood in the art. In illustrative embodiments, the various ingredients described herein are mixed together. Next, the mixture may be pasteurized for safety purposes. After pasteurization, the mixture is homogenized (or homogenization may precede pasteurization) to promote a smooth texture of the final product. Then, the ingredients are allowed to cool and flavors may be added. The cooled, homogenized mixture is whipped and cooled, simultaneously, for example in a batch freezer or continuous freezer, such that it retains air. At this point in time, additional flavors and ingredients may be added, for example by stirring.

Finally, the frozen confectionary product is packaged or formed into novelties and further cooled for storage purposes.

The frozen confectionary products may be packaged or in various novelty forms according to methods known in the art. For example, the frozen confectionary products may be packaged in a paper or plastic container. The container may hold, for example, a half pint, a pint, or a half gallon of the frozen confectionary product or it can be a cone, sandwich, frozen bar, or candy bar.

In some embodiments, the frozen confectionary product may by packaged into two half-pint containers. The half-pint containers may be bound together by additional packaging. This packaging arrangement, compared to pint-sized containers, allows consumers to enjoy a smaller quantity of the product in each sitting without needing to open an entire pint of the product. Thus, this packing arrangement preserves the quality of the product by protecting it from heat shock.

In yet another aspect of the present disclosure, a second frozen confectionary product comprising a base frozen confection is provided. In this aspect, the base frozen confection comprises:
    about 4% to about 70% of a vegetable or vegetable derivative component;
    about 15% to about 35% of a sweetening agent;
    about 6 to about 16% of an oil;
    about 0.001 to about 2% of an emulsifier;
    about 0.001 to about 2% of a stabilizer; and
    about 0.001 to about 2% of a salt.

In some embodiments of the second frozen confectionary product, the vegetable or vegetable derivative component is selected from the group consisting of a vegetable, a pulse, a vegetable protein, a nut solid, and any combination thereof. In certain aspects, the vegetable is present between about 2% to about 25% (wt %) of the base frozen confection. In other aspects, the pulse is present between about 2% to about 25% (wt %) of the base frozen confection. In yet other aspects, the vegetable protein is present between about 0.01% to about 10% (wt %) of the base frozen confection. In other aspects, the nut solid is present between 0% to about 25% (wt %) of the base frozen confection.

The previously described embodiments of the frozen confectionary product and the ingredients therein are applicable to the second frozen confectionary product described herein.

In yet another aspect of the present disclosure, a third frozen confectionary product comprising a base frozen confection is provided. In this aspect, the base frozen confection comprises:
    about 4% to about 70% of a vegetable or vegetable derivative component;
    about 15% to about 35% of a sweetening agent;
    about 6 to about 16% of an oil;
    about 0.001 to about 2% of an emulsifier;
    about 0.001 to about 2% of a stabilizer; and
    about 0.001 to about 2% of a salt.

In some embodiments of the third frozen confectionary product, the vegetable or vegetable derivative component comprises about 5% to about 20% of a vegetable, about 5 to about 20% of a pulse, and about 1% to about 6% of a vegetable protein.

The previously described embodiments of the frozen confectionary product and the ingredients therein are applicable to the third frozen confectionary product described herein.

EXAMPLE 1

Preparation of Frozen Confectionary Product

Typical processing of dairy-based products such as ice cream includes preparation of a base mix using dairy ingredients such milk, cream, and milk proteins along with emulsifiers and gum stabilizers. The mixed base is then homogenized, pasteurized using a plate and frame heat exchanger, aged, and finally frozen using commercial freezing machines.

Plate and frame heat exchangers generally limit passage of certain ingredients due to their typical configuration. Accordingly, addition of many vegetables and/or vegetable derivatives in the base mix would be undesirable due to the possibility of "burn off" and pressure build up in the pasteurizer. Furthermore, vegetables and beans are known to comprise dent starch, which is activated upon institution of a shear and heat process. If the dent starch was activated, it would undesirably soak up available water in the formulation and possibly reduce potential ice crystals in the finished product.

Activation would be possible if the vegetables were added in the mix prior to pasteurization so that they could proceed through the homogenization and heating process. Accordingly, finer vegetable and vegetable derivatives were selected in order to pass through the homogenizer and plate and frame heat exchanger. In this example, the particle size present in the puree was targeted to be equal to or less than about 1500 microns.

Furthermore, various experiments were conducted to evaluate addition of the vegetables post-pasteurization. Vegetable and vegetable derivatives were combined with the pasteurized base mix and the combination was then recirculated for 10 minutes using a centrifugal pump to achieve a homogenous mix. After mixing, visible vegetable particulates were noted in the combination. When this combination was passed through the commercial freezer, a grittier, textured product discharge was noted.

As expected, ice crystallization was observed in this finished product following two weeks of temperature abuse compared to a product made with vegetables that were added before pasteurization. Due to the starch not activating, free or unbound water was converted into large ice crystals. Furthermore, the product had a grittier texture and mouthfeel, presumably due to unbroken vegetable particulates in the product.

An exemplary process for preparation of the frozen confectionary products includes combination of the ingredients of the base mix using a high shear mixer. This resultant mix will then be homogenized using a two-stage homogenizer at a pressure of about 1500 to about 2500 psi. Thereafter, the mix will be pasteurized using a plate and frame heat exchanger. The pasteurized mix will be aged for one hour then stored in flavor tanks in order to add optional additional flavorings. The final combination will be placed in a commercial freezer and then mixed with desired adjunct compositions such as inclusions or sauces.

EXAMPLE 2

Exemplary Frozen Confectionary Product

A first exemplary frozen confectionary product was prepared. The target composition of the formulation is shown in Table 1.

TABLE 1

Composition of first exemplary frozen confectionary product.

| Component | Amount (% wt) |
|---|---|
| Water | 30-50% |
| Navy Bean Puree | 5-20% |
| Agave Syrup | 15-35% |
| Cauliflower Puree + Sweet Potato Puree | 5-20% |
| Coconut Oil | 6-16% |
| Pea Protein | 1-6% |
| Sunflower Lecithin | 0.001-2% |
| Sea Salt | 0.001-2% |
| Carob Bean Gum | 0.001-2% |

EXAMPLE 3

Exemplary Frozen Confectionary Product

A second exemplary frozen confectionary product was prepared. The target composition of the formulation is shown in Table 2.

TABLE 2

Composition of second frozen confectionary product.

| Component | Amount (% wt) |
|---|---|
| Water | 30-50% |
| Navy Bean Puree | 5-20% |
| Peanut Butter | 1-18% |
| Agave Syrup | 15-35% |
| Cauliflower Puree + Sweet Potato Puree | 5-20% |
| Coconut Oil | 6-16% |
| Pea Protein | 1-6% |
| Sunflower Lecithin | 0.001-2% |
| Sea Salt | 0.001-2% |
| Carob Bean Gum | 0.001-2% |

EXAMPLE 4

Exemplary Frozen Confectionary Product

A third exemplary frozen confectionary product was prepared. The target composition of the formulation is shown in Table 3.

TABLE 3

Composition of third frozen confectionary product.

| Component | Amount (% wt) |
|---|---|
| Water | 30-50% |
| Navy Bean Puree | 5-20% |
| Cashew Butter | 1-18% |
| Agave Syrup + Date Syrup | 15-35% |
| Cauliflower Puree + Sweet Potato Puree | 5-20% |
| Coconut Oil | 6-16% |
| Pea Protein | 1-6% |
| Sunflower Lecithin | 0.001-2% |
| Sea Salt | 0.001-2% |
| Carob Bean Gum | 0.001-2% |

The invention claimed is:

1. A frozen confectionary product comprising a base frozen confection, wherein the base frozen confection comprises
   4% to 70% by weight of a combined total of i) a vegetable, and ii) a component selected from the group consisting of a pulse, a nut solid, a seed solid, and any combination thereof,
   wherein the vegetable is from 2% to 25% by weight,
   wherein the pulse, when present, is from 2% to 25% by weight,
   wherein the nut solid, when present, is from 1% to 25% by weight, and
   wherein the seed solid, when present, is from 1% to 25% by weight;
   15% to 35% by weight of a sweetening agent;
   6% to 16% by weight of an oil;
   0.001% to 2% by weight of an emulsifier;
   0.001% to 2% by weight of a stabilizer; and
   0.001% to 2% by weight of a salt.

2. The frozen confectionary product of claim 1, wherein the pulse is a lentil.

3. The frozen confectionary product of claim 1, wherein the vegetable is selected from the group consisting of cauliflower, sweet potato, avocado, butternut squash, pumpkin, spinach, zucchini, jicama, rutabaga, parsnips, turnips, spinach, kale, arugula, potato, carrots, peas, collard greens, lettuce, watercress, parsley, corn, plantains, taro, water chestnuts, acorn squash, tomatoes, hubbard squash, bell peppers, radishes, eggplant, cucumbers, cabbage, bamboo shoots, asparagus, artichokes, beets, cactus, celery, green beans, kohlrabi, mushrooms, chayote, and any combination thereof.

4. The frozen confectionary product of claim 1, wherein the pulse is selected from the group consisting of navy beans, black beans, pinto beans, white cannellini beans, great northern beans, red kidney beans, black eye-peas, garbanzo beans, lentils, mung beans, pink beans, soy beans, split peas, white beans, *faba* beans, lupins, pigeon peas, Bambara beans, and any combination thereof.

5. The frozen confectionary product of claim 1, wherein the frozen confectionary product comprises an ingredient selected from the group consisting of pea protein, chickpeas, soy protein, wheat protein, cotton seed protein, sunflower seed, lupin protein, oat protein, lentil protein, sesame seed protein, broad bean protein, horse bean protein, alfalfa protein, clover protein, rice protein, tapioca protein, pumpkin protein, corn protein, and any combination thereof.

6. The frozen confectionary product of claim 1, wherein the nut solid is selected from the group consisting of almonds, cashews, peanuts, walnuts, macadamia nuts, pecans, pistachios, chestnuts, hazelnuts, Brazil nuts, pine nuts, pili nuts, and any combination thereof.

7. The frozen confectionary product of claim 1, wherein the seed solid is selected from the group consisting of sunflower, pepitas, pumpkin, millets, sesame, *quinoa*, flaxseed, chia, buckwheat, amaranth, and combinations thereof.

8. The frozen confectionary product of claim 1, wherein the one or more sweetening agents is selected from the group consisting of one or more traditional sweeteners, one or more non-traditional sweeteners, one or more sugar substitutes, one or more sugar alcohols, and any combination thereof.

9. The frozen confectionary product of claim 8, wherein the one or more non-traditional sweeteners is selected from the group consisting of blue agave, dates, coconut palm sugar, maple syrup, honey, and any combination thereof.

10. The frozen confectionary product of claim 1, wherein the stabilizer is selected from the group consisting of carob bean gum, cellulose gum, xanthan gum, tara gum, gellen gum, agar, arrowroot, guar gum, tapioca starch, carrageenan, and any combination thereof.

11. The frozen confectionary product of claim 1, wherein the frozen confectionary product is substantially free of a dairy component.

12. The frozen confectionary product of claim 1, wherein the frozen confectionary product is free of a dairy component.

13. The frozen confectionary product of claim 1, wherein the combined total of the vegetable and the component comprises 5% to 20% by weight of the vegetable, 5% to 20% by weight of the pulse, and 1% to 6% by weight of an ingredient selected from the group consisting of pea protein, chickpeas, soy protein, wheat protein, cotton seed protein, sunflower seed, lupin protein, oat protein, lentil protein, sesame seed protein, broad bean protein, horse bean protein, alfalfa protein, clover protein, rice protein, tapioca protein, pumpkin protein, corn protein, and any combination thereof.

14. The frozen confectionary product of claim 8, wherein the one or more non-traditional sweeteners is selected from the group consisting of blue agave, dates, coconut palm sugar, maple syrup, and any combination thereof.

15. The frozen confectionary product of claim 1, wherein the frozen confectionary product comprises an adjunct composition from 5-15% by weight of the frozen confectionary product.

\* \* \* \* \*